United States Patent [19]

Pidgeon

[11] Patent Number: 5,081,879
[45] Date of Patent: Jan. 21, 1992

[54] STEERING COLUMN ASSEMBLY MOUNTING BRACKET

[75] Inventor: Peter N. Pidgeon, Belmont, Australia

[73] Assignee: Ford Motor Company, Dearborn, Mich.

[21] Appl. No.: 528,649

[22] Filed: May 24, 1990

[51] Int. Cl.[5] .......................... B62D 1/16; B62D 1/19
[52] U.S. Cl. ..................................... 74/492; 280/777; 280/779
[58] Field of Search .................. 74/492, 493; 280/775, 280/777, 779; 248/548, 900; 188/371, 376

[56] References Cited

U.S. PATENT DOCUMENTS

| | | |
|---|---|---|
| 1,435,990 | 11/1922 | Sorensen . |
| 3,392,599 | 7/1968 | White ............................ 280/777 X |
| 3,492,888 | 2/1970 | Nishimura et al. ..................... 74/492 |
| 3,504,567 | 4/1970 | Ohashi et al. ........................ 74/492 |
| 3,788,148 | 1/1974 | Connell et al. ....................... 74/492 |
| 4,006,647 | 2/1977 | Oonuma et al. ....................... 74/492 |
| 4,086,825 | 5/1978 | Babcock et al. ....................... 74/492 |
| 4,274,299 | 6/1981 | Jones ................................... 74/492 |
| 4,317,387 | 3/1982 | Myers et al. .......................... 74/493 |
| 4,400,990 | 8/1983 | Cook et al. ........................... 74/492 |
| 4,445,708 | 5/1984 | Oakes et al. ......................... 280/777 |
| 4,509,386 | 4/1985 | Kimberlin ............................. 74/492 |
| 4,616,522 | 10/1986 | White et al. .......................... 74/492 |
| 4,669,325 | 6/1987 | Nishikawa et al. ................ 74/493 X |
| 4,703,669 | 11/1987 | Hyodo ............................ 248/548 X |
| 4,867,003 | 9/1989 | Beauch et al. ........................ 74/492 |
| 4,886,295 | 12/1989 | Browne ............................. 280/777 |
| 4,914,970 | 4/1990 | Mastrofrancesco et al. ... 248/900 X |
| 4,951,522 | 8/1990 | Chowdhury et al. .......... 188/371 X |

FOREIGN PATENT DOCUMENTS

| | | | |
|---|---|---|---|
| 56-75264 | 6/1981 | Japan ..................................... 74/492 |
| 57-51574 | 3/1982 | Japan ..................................... 74/492 |
| 1238141 | 7/1971 | United Kingdom .................. 74/492 |
| 2105441 | 3/1983 | United Kingdom .................. 74/492 |

*Primary Examiner*—Allan D. Herrmann
*Assistant Examiner*—Julie Krolikowski
*Attorney, Agent, or Firm*—Raymond L. Coppiellie; Roger L. May

[57] ABSTRACT

A mounting mechanism for mounting a steering column in a vehicle, the steering column having a steering shaft assembly having an upper end connected to a steering wheel and a lower end connected to a steering linkage as well as an upper jacket surrounding and rotatably supporting the upper end of the steering shaft and a lower jacket surrounding and rotatably supporting the lower end of the steering shaft is disclosed. The mounting mechanism includes means for securing the mounting mechanism to the vehicle as well as means for rotatably mounting the lower jacket to the mounting mechanism so that the lower jacket rotates relative to the mounting bracket upon exertion of a predetermined axial load upon the vehicle and without rotation of the lower jacket relative to the upper jacket. A steering column assembly structured in accord with the present invention is also disclosed, wherein the lower jacket includes means for preventing axial displacement of the lower jacket relative to the lower mounting bracket as well as vibration isolation means for preventing vibration of the lower jacket relative to the mounting bracket.

20 Claims, 2 Drawing Sheets

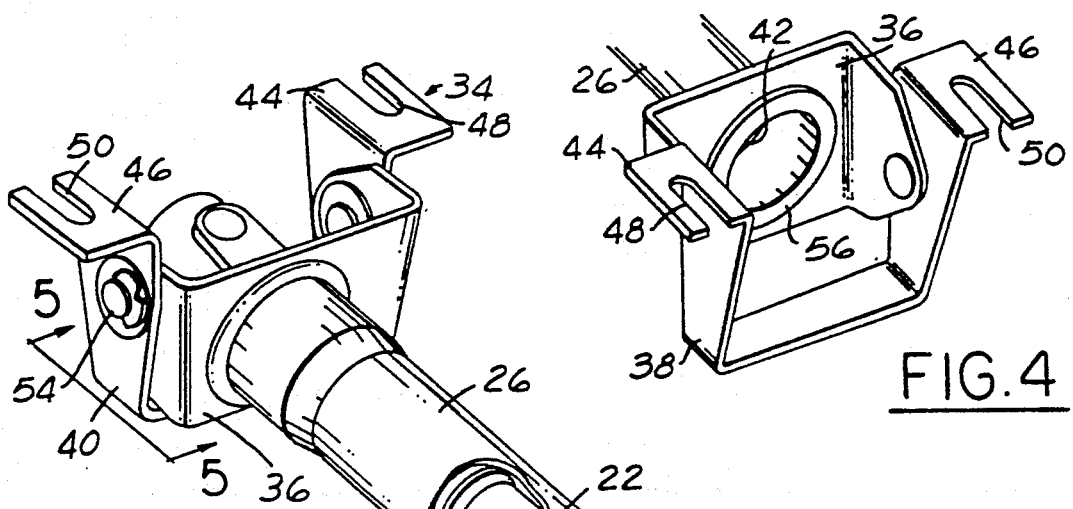
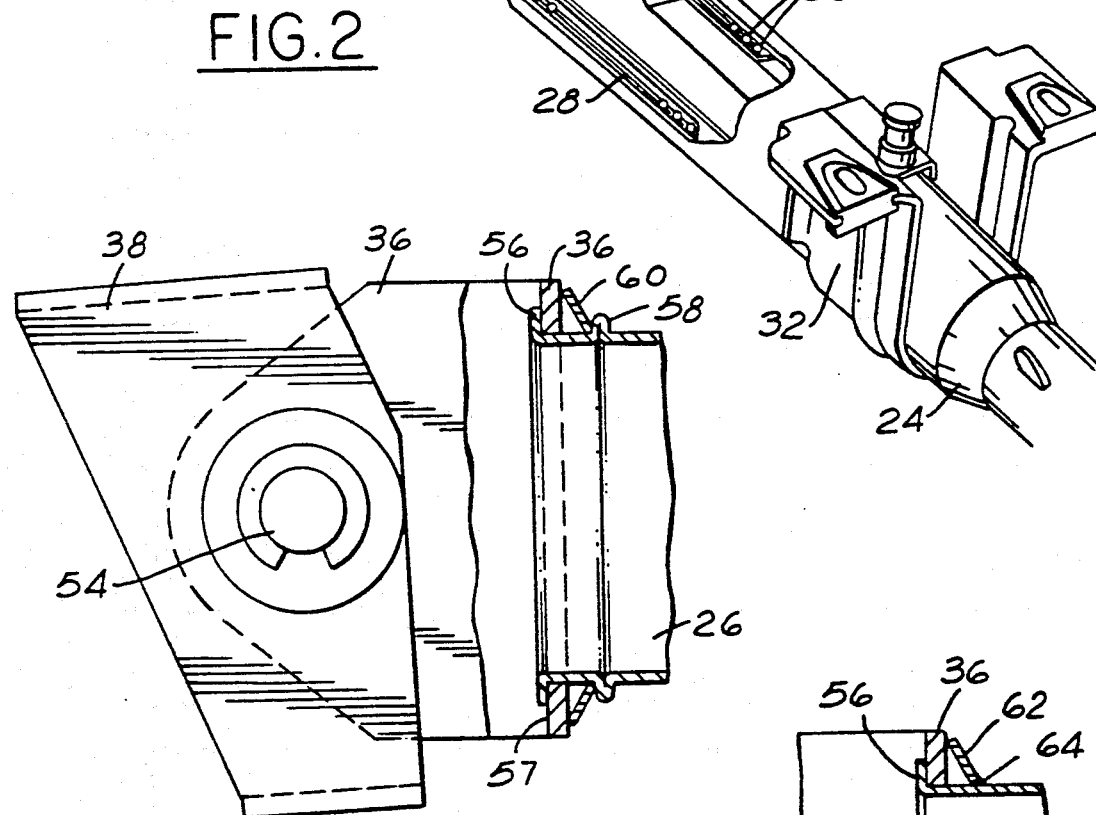

STEERING COLUMN ASSEMBLY MOUNTING BRACKET

BACKGROUND OF THE INVENTION

1. Field of the Invention

The present invention relates generally to mounting brackets for securing a steering column assembly to an automotive chassis. More particularly, the present invention relates to a mounting bracket for rotatably securing the lower jacket of a telescopic steering column assembly to a vehicle chassis.

2. Description of the Related Art

One conventional type of steering column assembly comprises two shaft sections supported in a two-piece telescopic jacket assembly wherein an upper jacket is telescopically collapsible relative to a lower jacket. This telescoping may occur upon a front end impact of the vehicle. Typically, a bracket rigidly mounts each of the jackets to the vehicle chassis. Examples of such brackets are disclosed in U.S. Pat. Nos. 1,435,990; 3,492,888; 4,086,825; 4,274,299; 4,400,990; 4,616,522; and 4,867,003. Each of these patents disclose the use of mounting brackets which mount the steering column assembly to the vehicle chassis.

It has been proposed to mount an energy absorbing element coaxially with and between the two jackets such that the energy absorbing element deforms under impact loads generated during a front end collision. In this manner, the steering column collapses at a controlled rate so that the kinetic energy of impact is absorbed in a gradual movement of the column. One such type of energy absorbing element is shown in U.S. Pat. No. 3,788,148 wherein a plurality of deformer balls are disposed in preformed recesses between the telescoping jackets. During an impact, the balls remain in their preformed recesses until a predetermined load is exceeded, whereafter the balls engage the jacket walls in an interfering relationship to absorb energy. The upper and lower jackets must remain aligned during the impact so that the balls remain in the preformed paths during the loading to provide the controlled collapse of the steering column. Also, the jackets must remain aligned to prevent binding of the jackets as the jackets telescope with respect to one another. However, the prior art mounting brackets often do not maintain the jacket alignment under the axial load.

However, if the two jackets become misaligned with respect to one another as a result of angular misalignment of the column mounting points during assembly or due to twisting of the mounting brackets during structural deformation during the collision, the energy absorbing elements are forced out of their predetermined relationships with the jackets and controlled collapse of the steering column is impaired. Therefore, it would be advantageous to provide a means of eliminating the torsional misalignment of the jackets with respect to one another to ensure a properly controlled collapse of the steering column.

It is an object of the present invention to provide a mounting bracket which overcomes the disadvantages discussed above due to rigidly mounting the jackets to the vehicle and the misalignment of the upper and lower jackets with respect to one another under the imposition of an axial load upon the steering column.

It is a further object of the present invention to eliminate the load sensitivity of the steering column to misalignment of the energy absorbing element as well as mounting point misalignment and torsional twist of the assembly during an axial loading upon the steering column by permitting the lower jacket to rotate relative to the mounting bracket of the steering column assembly.

It is a feature of the invention to provide a mounting bracket for rotatably mounting the lower jacket to the vehicle which allows the lower jacket as well as the steering column assembly to rotate with respect to the mounting bracket upon imposition of an axial load upon the steering column to minimize torsional loads placed upon the column assembly by preventing relative twist between the jackets.

SUMMARY OF THE INVENTION

In accordance with the invention, there is disclosed herein a mounting mechanism for mounting a steering column in a vehicle, the steering column including a steering shaft assembly having an upper end connected to a steering wheel and a lower end connected to a steering linkage. The steering column further includes an upper jacket surrounding and rotatably supporting the upper end of the steering shaft assembly as well as a lower jacket surrounding and rotatably supporting the lower end of the steering shaft assembly, the upper jacket being telescopically collapsible relative to the lower jacket. The steering column also includes an energy absorbing device interposed between the upper and lower jackets. The mounting mechanism comprises means for securing the mounting mechanism to the vehicle and means for rotatably mounting the lower jacket of the steering column to the mounting mechanism operative to permit the lower jacket to rotate relative to the mounting mechanism upon imposition of a predetermined axial load upon the steering column.

The means for rotatably mounting the lower jacket includes a bracket having a pair of generally vertical legs and a wall member disposed therebetween, the wall member including an aperture for receiving the lower jacket therethrough. Each of the vertical legs further includes a generally planar tab extending generally perpendicular to each of the legs, each tab including a slot for receiving a fastener therethrough for securing the bracket to the vehicle.

There is further disclosed herein a steering column assembly including a mounting mechanism as generally described above. The steering column assembly also includes means for preventing axial displacement of the lower jacket relative to the mounting mechanism, this means including a turned-over edge circumferentially disposed around one end of the lower jacket. The turned-over edge has an external diameter greater than the diameter of the aperture and abuts an inner surface of the wall member of said bracket. The means for preventing axial displacement of the lower jacket further includes a protuberance circumferentially disposed around a lower end of the lower jacket and proximate an exterior surface of the wall member of the bracket. In another embodiment, the means for preventing axial displacement of the lower jacket includes an annulus having an inner diameter substantially equal to the diameter of the lower jacket and an outer diameter greater than the diameter of the jacket and greater than the diameter of the aperture. The annulus is securely fastened to the lower jacket proximate an exterior surface of the wall member.

The steering column assembly of the present invention further includes vibration isolation means for minimizing vibration of the lower jacket with respect to the mounting mechanism including means for resiliently biasing the lower jacket against the bracket. The vibration isolation means comprises an elastomeric bushing interposed between the means for preventing axial displacement of the lower jacket and the bracket. The vibration isolation means may further comprise a spring means interposed between the means for preventing axial displacement of the lower jacket and the bracket.

In one embodiment, the energy absorbing means interposed between the upper and lower jackets comprises a plurality of balls disposed in a cage assembly interposed between the upper and lower jackets.

BRIEF DESCRIPTION OF THE DRAWINGS

Reference will now be made to the accompanying drawings in which:

FIG. 2 is a perspective view, partially sectioned, of the steering column of the steering assembly of FIG. 1;

FIG. 4 is a rear elevational view of the mounting bracket of FIG. 3;

FIG. 5 is a cross-sectional view taken along line 5—5 of FIG. 2; and

FIG. 6 is a cross-sectional view of an alternative embodiment of a mounting bracket structured in accord with the principles of the present invention.

DETAILED DESCRIPTION OF THE PREFERRED EMBODIMENT

Figure 1:
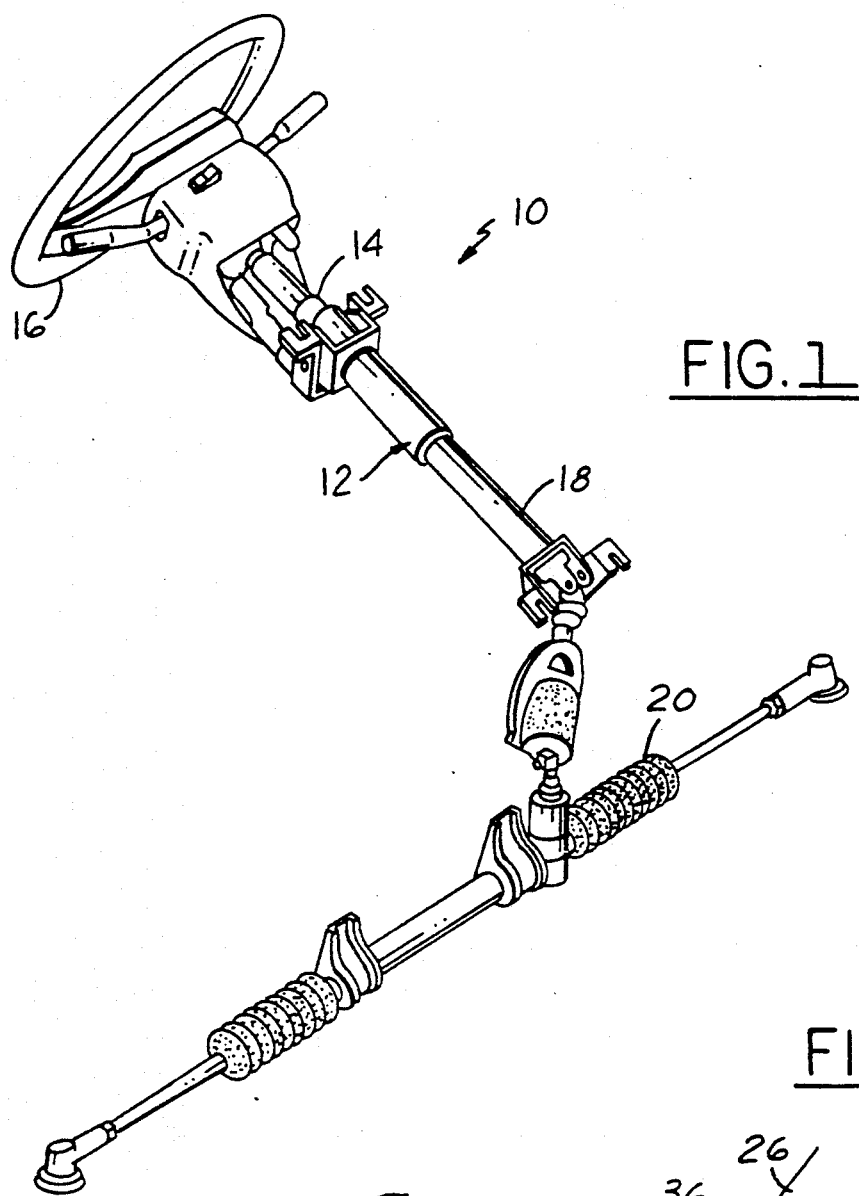
FIG. 1 is a perspective view of a steering assembly.

Referring now to the Figures and particularly to FIG. 1, steering assembly 10 includes a steering column assembly 12 having an upper shaft section 14 connected to a steering wheel 16 and a lower shaft section 18 connected to a steering linkage 20. The steering column assembly 12 is an energy absorbing steering column assembly, one which upon a front end collision of the vehicle, the steering column assembly 12 will absorb energy, transferred as a result of impact to the vehicle, in a controlled manner and in a direction generally longitudinally of the vehicle in response to loads applied along its axis. The upper shaft section 14 of steering column assembly 12 is telescopically collapsible relative to the lower shaft section 18 of the column assembly 12. However, the present invention is not meant to be limited only for use in telescoping steering columns, it being understood to those skilled in the art that other conventional types of steering columns may also be used.

The steering column assembly 12 of FIG. 1 is shown in further detail in FIG. 2. As shown in FIG. 2, the steering column assembly 12 includes a steering shaft 22 rotatably mounted and surrounded by an upper jacket 24 and a lower jacket 26. As will be apparent to those skilled in the art, steering shaft 22 may be configured as any of a variety of known steering shafts, and the present invention is not meant to be limited to a specific type of steering shaft. Upper jacket 24 telescopes relative to lower jacket 26 under an axially applied load along the axis of steering shaft 22. Interposed between upper jacket 24 and lower jacket 26 is an energy-absorption device, such as a ball-cage assembly 28. In the preferred embodiment, and as shown in FIG. 2, the energy absorption device comprises a plurality of balls 30 disposed in a plurality of axially extending tracks or paths (not shown) such that under an axially applied load, the balls 30 remain in their predefined paths and provide a first level of energy absorption through mechanical interference between the balls 30 and the jackets 24, 26. Furthermore, the ball-cage assembly 28 imparts a greater bending stiffness to the column assembly 12. The column assembly also is less susceptible to binding during telescopic collapse due to the bearing-like nature of balls 30. Many other types of energy absorbing devices are known in the art and the present invention is not meant to be limited for use with the ball-cage assembly described above.

The upper jacket 24 and the upper end of steering shaft 22 are secured to the vehicle chassis by means of an upper mounting bracket 32. Construction of upper mounting bracket 32 is well known in the art and further description of such is deemed unnecessary here. The lower jacket assembly 26 and consequently the lower end of steering shaft 22 are secured to the vehicle chassis by means of a lower mounting bracket 34. The lower mounting bracket 34 is constructed to allow the lower jacket 26 to rotate relative to the mounting bracket 34 under a predetermined axial load upon the steering column. It has been determined that if the upper jacket 24 and lower jacket 26 become misaligned with respect to one another as a result of angular misalignment of the column mounting points of brackets 32 and 34 during assembly or of twisting of the mounting brackets 32, 34 during structural deformation during axial loading, the balls 30 are forced out of the predefined, axially extending paths and controlled collapse of the steering column assembly 12 is impaired. By providing the lower mounting bracket 34 such that lower jacket 26, as well as steering column assembly 12, rotates relative to mounting bracket 34, the balls 30 remain within their predefined paths during axially loading regardless of the alignment of the lower jacket 26 and upper jacket 24. The construction of lower mounting bracket 34 is shown in further detail with respect to FIGS. 3 and 4.

Figure 3:
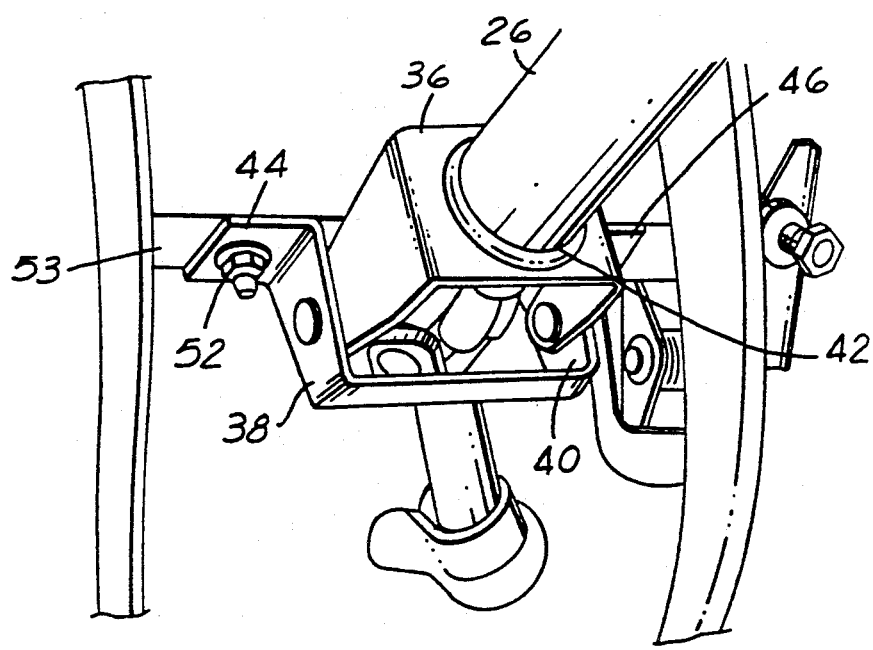
FIG. 3 is a perspective view of a lower steering column mounting bracket structured in accord with the principles of the present invention.

As is shown in FIGS. 3 and 4, the lower mounting bracket 34 includes a pair of vertical legs 38, 40 and a wall member 36 between legs 38 and 40. Each of the vertical legs 38, 40 includes a generally planar tab 44, 46 respectively, each having a slot 48, 50 for receiving a fastening device 52 therethrough for securing the lower mounting bracket to the vehicle chassis 53. In the preferred embodiment, the wall member 36 is a U-shaped member pivotally secured to the legs by hinge 54 so that the steering column assembly 12 may pivot to provide an adjustable height steering column assembly such as in a tilt-wheel steering assembly. Hinge 54 also reduces bending stresses which may develop in the steering column during an impact as well as possible subsequent column rotation through deformation of the column mounting points. Alternatively, wall member 36 may be rigidly secured between legs 38, 40. The wall member 36 includes an aperture 42 for receiving the lower end of the lower jacket 26 therethrough.

As can be seen in FIG. 4 as well as in FIG. 5, lower jacket 26 includes a turned-over edge 56 at one end thereof. Turned-over edge 56 has a diameter greater than the diameter of aperture 42 and abuts an interior surface 57 of the wall member 36. The turned-over edge may be formed by a variety of manufacturing processes known to those skilled in the art, such as staking or other metal forming operations. Alternatively, the turned-over edge may comprise a washer welded to the end of the lower jacket 26. The turned-over edge 56 provides a means for preventing axial displacement of the lower jacket 26 with respect to the lower mounting bracket 34 in that the turned-over edge 56 prevents lower jacket 26 from pulling out of aperture 42 of lower mounting bracket 34.

As can be seen in FIG. 5, lower jacket 26 further includes a protuberance 58 circumferentially disposed around the lower jacket 26. The protuberance is disposed proximate an exterior surface of the wall member 36 of the bracket 34 and prevents the lower jacket 26 from axially sliding through the aperture 42 when a load is applied axially along the length of the steering column 12. In this respect, protuberance 58 and turned-over edge 56 provide means for preventing axial displacement in both directions of the lower jacket 26. The protuberance 58 may be formed by a variety of known manufacturing processes, such as swaging, and the present invention is not meant to be limited to any of a specific manufacturing process.

As is further shown in FIG. 5, the steering column assembly includes a spring washer 60 interposed between protuberance 58 and the wall member 36 of bracket 34. The spring washer, such as a Belleville washer or any other type of spring washer, prevents an excessive amount of vibration of the lower jacket 26 relative to the mounting bracket 34 and, as such, acts as a vibration isolation means. An elastomeric bushing, such as a rubber washer or other type of bushing, may be also interposed between protuberance 58 and wall member 36 to provide means for preventing vibration of the lower jacket 26 with respect to the mounting bracket 34.

Referring now to FIG. 6, an alternative embodiment of the present invention is shown. FIG. 6 is a side cross-sectional view of the alternative embodiment wherein the protuberance and spring washer of FIG. 5 are replaced by a washer 62 welded to the external diameter of lower jacket 26 by weld 64. Washer 62 fits tightly around the external diameter of lower jacket 26 and and washer 62 has an external diameter greater than the diameter of aperture 42. Washer 62 is welded to lower jacket 26 at an angle such that washer 62 prevents vibration of lower jacket 26 as well as axial displacement of the lower jacket 26 relative to bracket 34. Washer 62 may be resilient and further prevent vibration of the lower jacket 26.

In operation, upon imposition of an axial load upon steering column assembly 12, lower jacket 26 telescopes relative to upper jacket 24. If lower jacket 26 is misaligned to upper jacket 24 due to misalignment of the mounting points of upper mounting bracket 32 or lower mounting bracket 34 through slots 48, 50 or in the event that the load causes the lower mounting, bracket 34 to structurally deform and angularly misalign, the lower jacket may be caused to rotate relative to its mounting bracket 34. This rotation prevents rotation of the lower jacket 26 relative to the upper jacket 24. It is essential that the lower jacket rotate under a torque less than the torque needed to displace the balls 30 of the energy absorption device out of their predefined, axially extending pathways so that the lower jacket 26 and upper jacket 24 remain relatively aligned for purposes of telescopic collapse. For example, in the preferred embodiment, lower jacket 26 will rotate under a torque of approximately 10–20 NM due to the construction of protuberance 58, spring washer 60 and turned-over edge 56. It has been determined that balls 30 within the ball and cage assembly are forced out of their predefined paths under a torque of approximately 40–60 NM. By providing a lower mounting bracket 34 such that the lower jacket 26 rotates within lower mounting bracket 34 under a torque less than that needed to displace the balls from their predefined paths in the energy absorption device, controlled collapse of the steering column assembly can be properly maintained. The present invention may also be utilized with a curl strap assembly either in conjunction with or in place of the ball-and-cage assembly energy absorption device.

While the above disclosures are the preferred embodiment of the present invention, it will be understood that modifications, variations and alterations may be made to the present invention without varying from the scope and fair meaning of the appended claims. The following claims, including all equivalents, define the scope of the present invention.

What is claimed is:

1. A mounting mechanism for mounting a steering column in a vehicle, said steering column including a steering shaft assembly having an upper end connected to a steering wheel and a lower end connected to a steering linkage, an upper jacket surrounding and rotatably supporting the upper end of said steering shaft assembly and a lower jacket surrounding and rotatably supporting said lower end of said steering shaft assembly, said upper jacket being telescopically collapsible relative to said lower jacket, and energy absorbing means interposed between said upper and lower jackets, said mounting mechanism comprising:

means for rotatably mounting said lower jacket to said mounting mechanism and for permitting said lower jacket to rotate relative to mounting mechanism upon imposition of a predetermined axial load upon said steering column; and means for securing said mounting mechanism to said vehicle.

2. A mounting mechanism as defined in claim 1, wherein said means for rotatably mounting said lower jacket includes a bracket having a pair of generally vertical legs and a wall member therebetween, said wall member including an aperture for receiving said lower jacket therethrough.

3. A mounting mechanism as defined in claim 2, wherein said means for securing said mounting mechanism to said vehicle further includes a pair of generally planar tabs, each of said pair of tabs extending generally perpendicular to each of said legs, and each of said pair of tabs including a slot for receiving a fastener therethrough.

4. A steering column assembly for an automotive vehicle comprising:

a steering shaft assembly having an upper end connected to a steering wheel and a lower end connected to a steering linkage;

an upper jacket surrounding and rotatably supporting the upper end of said steering shaft assembly;

a lower jacket surrounding and rotatably supporting the lower end of said steering shaft assembly, said upper jacket being telescopically collapsible relative to said lower jacket;

energy absorbing means interposed between said upper and lower jackets; and mounting means for rotatably securing said lower jacket to said vehicle operative to permit said lower jacket to rotate relative to said mounting means and to prevent relative rotation between said upper and lower jackets upon imposition of a predetermined axial load upon said vehicle.

5. A steering column assembly as defined in claim 4, wherein said mounting means comprises a bracket including an aperture for rotatably receiving said lower jacket therethrough.

6. A steering column assembly as defined in claim 5, wherein said bracket includes a pair of generally vertical legs and a wall member extending between said legs, said wall member including said aperture.

7. A steering column assembly as defined in claim 6, wherein said bracket further includes a pair of generally planar tabs, each one of said pair of tabs extending generally perpendicular to each of said legs and including a slot for receiving a fastener therethrough.

8. A steering column assembly as defined in claim 6, further including means for preventing axial displacement of said lower jacket relative to said mounting means.

9. A steering column as defined in claim 8, wherein said means for preventing axial displacement of said lower jacket includes a turned-over edge circumferentially disposed around one end of said lower jacket, said turned-over edge having an external diameter greater than the diameter of said aperture and abutting an inner surface of said wall member of said bracket.

10. A steering column as defined in claim 9, wherein said means for preventing axial displacement of said lower jacket further includes a protuberance circumferentially disposed around a lower end of said lower jacket and proximate an exterior surface of said wall member of said bracket.

11. A steering column as defined in claim 9, wherein said means for preventing axial displacement of said lower jacket further includes an annulus having an inner diameter substantially equal to the diameter of said lower jacket and an outer diameter greater than the diameter of said lower jacket, said annulus being securely fastened to said lower jacket proximate said bracket.

12. A steering column assembly as defined in claim 9, further including vibration isolation means for minimizing vibration of said lower jacket with respect to said mounting means.

13. A steering column assembly as defined in claim 12, further including means for resiliently biasing said lower jacket against said bracket.

14. A steering column assembly as defined in claim 12, wherein said vibration isolation means comprises an elastomeric bushing interposed between said means for preventing axial displacement of said lower jacket and said bracket.

15. A steering column assembly as defined in claim 12, wherein said vibration isolation means comprises spring means interposed between said means for preventing axial displacement of said lower jacket and said bracket.

16. A steering column assembly as defined in claim 15, wherein said spring means comprises a Belleville spring.

17. A steering column assembly as defined in claim 4, wherein said energy absorbing means comprises a plurality of balls disposed in cage assembly interposed between said upper and lower jackets.

18. A steering column assembly for an automotive vehicle comprising:
an upper rotatable steering shaft section connected at one end to a steering wheel;
a lower rotatable steering shaft section connected at one end to a steering linkage and connected to said upper shaft section for rotation therewith about a common steering axis;
an upper jacket surrounding and rotatably supporting said upper shaft section;
a lower jacket surrounding and rotatably supporting said lower steering shaft section, said upper jacket being telescopically collapsible relative to said lower jacket;
energy absorbing means coaxially mounted between said upper and lower jackets, said energy absorbing means comprising a plurality of balls disposed in a cage assembly interposed between said upper and lower jackets;
a mounting bracket rotatably securing said lower jacket to said vehicle and operative to permit said lower jacket to rotate upon imposition of a predetermined axial load upon said vehicle, said mounting bracket comprising a pair of generally vertical legs and a generally vertical member extending between said legs, said vertical member including an aperture for receiving said lower jacket therethrough; and
means for preventing axial displacement of said lower jacket with respect to said mounting bracket, said means comprising a turned-over edge circumferentially disposed around one end of said lower jacket, said turned-over edge abutting an inner surface of said vertical member of said mounting bracket and a protuberance circumferentially disposed around a lower end of said lower jacket and proximate an exterior surface of said vertical member of said mounting bracket.

19. A steering column assembly as defined in claim 18, wherein said mounting bracket further includes a pair of generally planar tabs, each one of said pair of tabs extending generally perpendicular to each of said legs, each tab including a slot for receiving a fastener therethrough.

20. A steering column assembly as defined in claim 18, further including means for resiliently biasing said lower jacket against said mounting means, said means comprising spring means interposed between said means for preventing axial displacement of said lower jacket and said mounting means.

* * * * *